United States Patent [19]

McKinley

[11] Patent Number: 5,493,574
[45] Date of Patent: Feb. 20, 1996

[54] POWER EFFICIENT RAM DISK AND A METHOD OF EMULATING A ROTATING MEMORY DISK

[75] Inventor: David McKinley, Santa Clara, Calif.

[73] Assignee: Zilog, Inc., Campbell, Calif.

[21] Appl. No.: 280,161

[22] Filed: Jul. 25, 1994

Related U.S. Application Data

[63] Continuation of Ser. No. 950,292, Sep. 24, 1992, abandoned.

[51] Int. Cl.⁶ ................................................. H03M 13/00
[52] U.S. Cl. ...................... 371/40.1; 371/37.1; 371/40.2
[58] Field of Search ................................. 371/40.1, 40.2, 371/40.4, 37.1, 10.1, 10.2, 10.3, 37.7, 26

[56] References Cited

U.S. PATENT DOCUMENTS

| | | | |
|---|---|---|---|
| 4,698,812 | 10/1987 | Peterson ................................. | 371/40.1 |
| 4,775,978 | 10/1988 | Hartness ................................. | 371/40.1 |
| 4,942,579 | 7/1990 | Goodlander et al. .................. | 371/10.1 |
| 4,972,417 | 11/1990 | Sako et al. ............................. | 371/40.1 |
| 5,058,116 | 10/1991 | Chao et al. ............................ | 371/40.1 |
| 5,077,737 | 12/1991 | Leger et al. ........................... | 371/10.1 |
| 5,109,505 | 4/1992 | Kihara .................................... | 371/10.1 |
| 5,131,089 | 7/1992 | Cole ....................................... | 395/500 |

OTHER PUBLICATIONS

Leffler, Samuel J. et al., "The Design and Implementation of the 4.3BSD UNIX Operating System," Addison–Wesley Publishing Company, pp. 187–221.

*Primary Examiner*—Robert W. Beausoliel, Jr.
*Assistant Examiner*—T. Tu
*Attorney, Agent, or Firm*—Skjerven, Morrill, MacPherson, Franklin & Friel

[57] ABSTRACT

Data is stored in and read from a semiconductor memory system including multiple memory integrated circuits in data units commonly exchanged with a rotating memory device. One or more data units to be stored are clustered with a multiplicity of other data units stored in the semi conductor memory to form a cluster of data units. The cluster of data units is compressed, and the compressed cluster of data units is then error correction coded. The compressed cluster of data units is then stored in the semiconductor memory with a multiplicity of contiguous data bits being stored in a single memory integrated circuit. Data compression reduces the number of memory integrated circuits required, thereby reducing both cost and power consumption. Data is stored in and read out of the memory integrated circuits serially such that only a single memory integrated circuit is active at a time, further reducing power consumption.

23 Claims, 15 Drawing Sheets

Data Structure for Compressed Data

Solid state Memory File system

Compressed Record of Logical addresses
(Content pointer of data block inclusters),
(Record 1)

16*32*512 = 256K bytes o
o
o

Compressed Record of Logical addresses
(Content pointer of data block inclusters),
(Record N)

16*32*512 = 256K bytes

POWER EFFICIENT RAM DISK AND A METHOD OF EMULATING A ROTATING MEMORY DISK

This application is a continuation of application Ser. No. 07/950,292, filed Sep. 24, 1992, now abandoned.

BACKGROUND OF THE INVENTION

1. Field of the Invention

The present invention relates to an apparatus and a method of emulating a disk drive memory storage device.

2. State of the Art

One of the present trends in computing is toward increasing miniaturization of computers and computing devices. Laptop, notebook and palmtop computers represent the fastest growing market segment in the computer market. Particularly with regard to laptop and notebook computers, the demand for mass storage devices for such computers, coupled with the space constraints inherent in building these machines, has resulted in the "form factor" of disk drives being reduced from 5¼ inch to 3½ inch and now down to 2½ inch. The projected trend is from 2½ inch form factor disk drives prevalent today toward sub-two-inch drives in 1994 and sub-one-inch drives in 1997.

As the form factor of disk drives becomes smaller, a multitude of serious problems may be expected to be encountered. Small disk plating techniques exhibit very low production yields. Since very low-flying heads or even contact-recording heads are required due to low linear disk speed and higher bit densities, contact of the head with the disk can cause "head slapping", resulting in higher shock requirements and excessive disk wear. Low-yield thin-film heads or vertical-recording-technology heads are required, as are small bearings or ceramics for the necessary motors and actuators. Signal-to-noise ratios will be significantly decreased, forcing the user to tolerate higher error rates and possible data loss. To accentuate the foregoing difficulties, hard disk suppliers are becoming fewer. As a result, the magnetic hard disk found in high-volume notebook PCs is expected to become difficult to purchase due to difficulty on the part of the hard disk manufacturer of supplying quality merchandise that can be produced with economical yields.

In contrast to the foregoing situation, solid-state semiconductor memories, in particular DRAMs, are presently in abundant supply at relatively low cost. In this respect, DRAMs represent an attractive alternative to small-form-factor disk drives for mass memory storage. Using DRAMs, memory performance may be increased by a factor of several times over a comparable hard drives. Unfortunately, however, DRAMs continually consume power, a scarce commodity in notebook applications. Solid-state RAM disks are known, as disclosed for example in U.S. Pat. No. 5,077,737, incorporated herein by reference. In general, the RAM disk of the foregoing patent is not designed for maximum power efficiency but is designed instead to utilize inexpensive "off-spec" DRAM chips. Other RAM disks are disclosed in U.S. Pat. Nos. 4,780,808 and 4,896,262.

A need therefore exists for curtailing the power consumption of DRAMs so that they may be used for mass memory storage in notebook applications. The present invention relates to a power efficient RAM disk and a method of emulating a rotating memory device.

SUMMARY OF THE INVENTION

According to the present invention, data is stored in and read from a semiconductor memory system including multiple memory integrated circuits in data units commonly exchanged with a rotating memory device. One or more data units to be stored are clustered with a multiplicity of other data units stored in the semiconductor memory to form a cluster of dam units. The cluster of dam units is compressed, and the compressed cluster of data units is then error correction coded. The compressed cluster of data units is then stored in the semiconductor memory with a multiplicity of contiguous data bits being stored in a single memory integrated circuit. Data compression reduces the number of memory integrated circuits required, thereby reducing both cost and power consumption. Data is stored in and read out of the memory integrated circuits serially such that only a single memory integrated circuit is active at a time, further reducing power consumption.

DETAILED DESCRIPTION OF THE PREFERRED EMBODIMENTS

Figure 1:
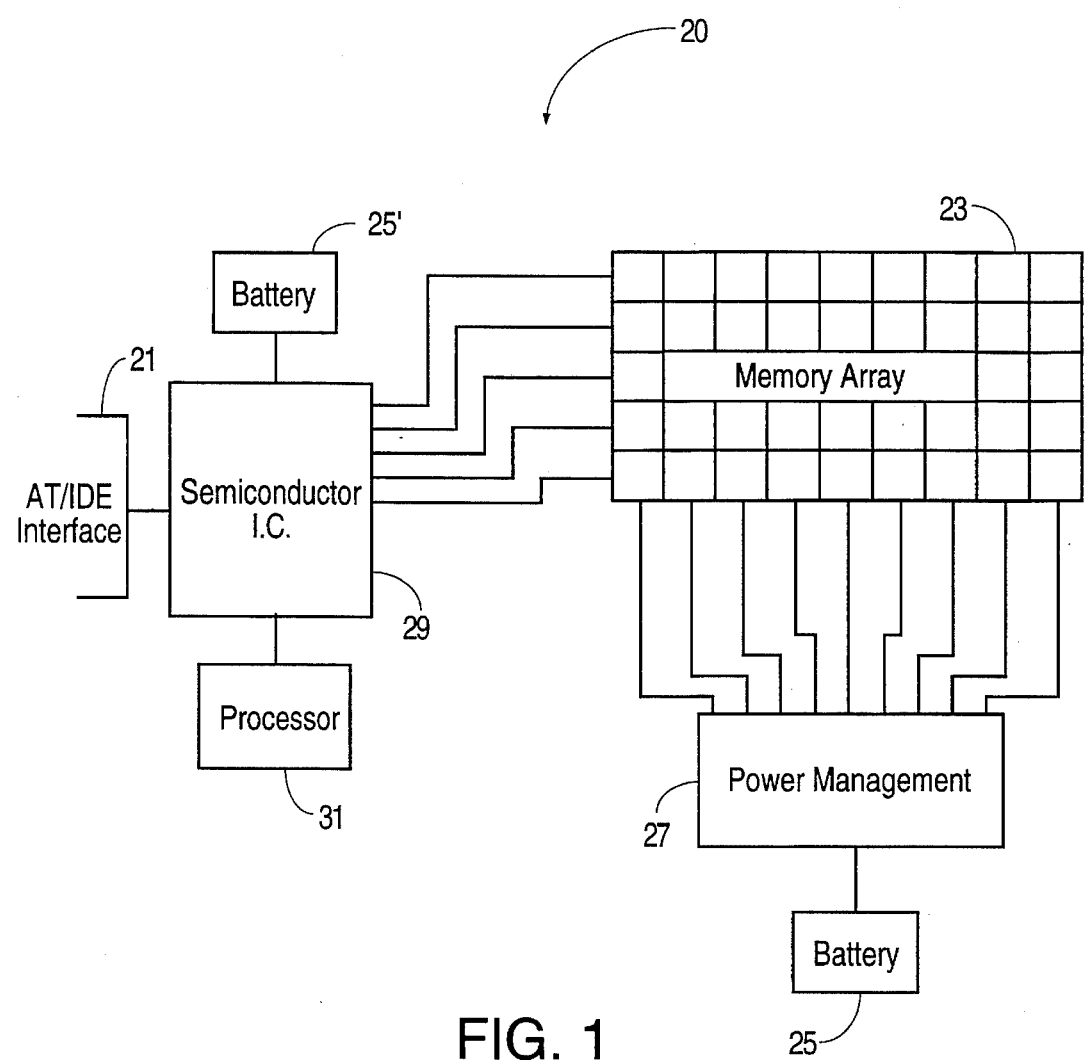
FIG. 1 is a block diagram of a power efficient RAM disk system.

Referring now to FIG. 1, a power-efficient RAM disk 20 is interfaced to a host device (not shown) through an intelligent interface 21 such as an AT/IDE, SCSI or ESDI interface. Intelligent interfaces such as the IDE, ESDI and SCSI interfaces are typically attached between a host computer and a rotating memory device. The host merely requests blocks of data information in 512-byte increments. The data is then intelligently managed between the rotating memory device and the host system. An error recovery system causes operations resulting in errors to be retried. In this manner, the intelligent interface provides a data path from the mass storage device to the host system without apparent data failure. The RAM disk of FIG. 1 offers greatly improved performance in comparison to conventional hard disks but looks to the computer exactly like a conventional hard disk. Furthermore, power consumption of the RAM disk is intelligently managed so as to curtail power consumption, making the RAM disk an attractive alternative to rotating memory devices in notebook applications.

Figure 2:
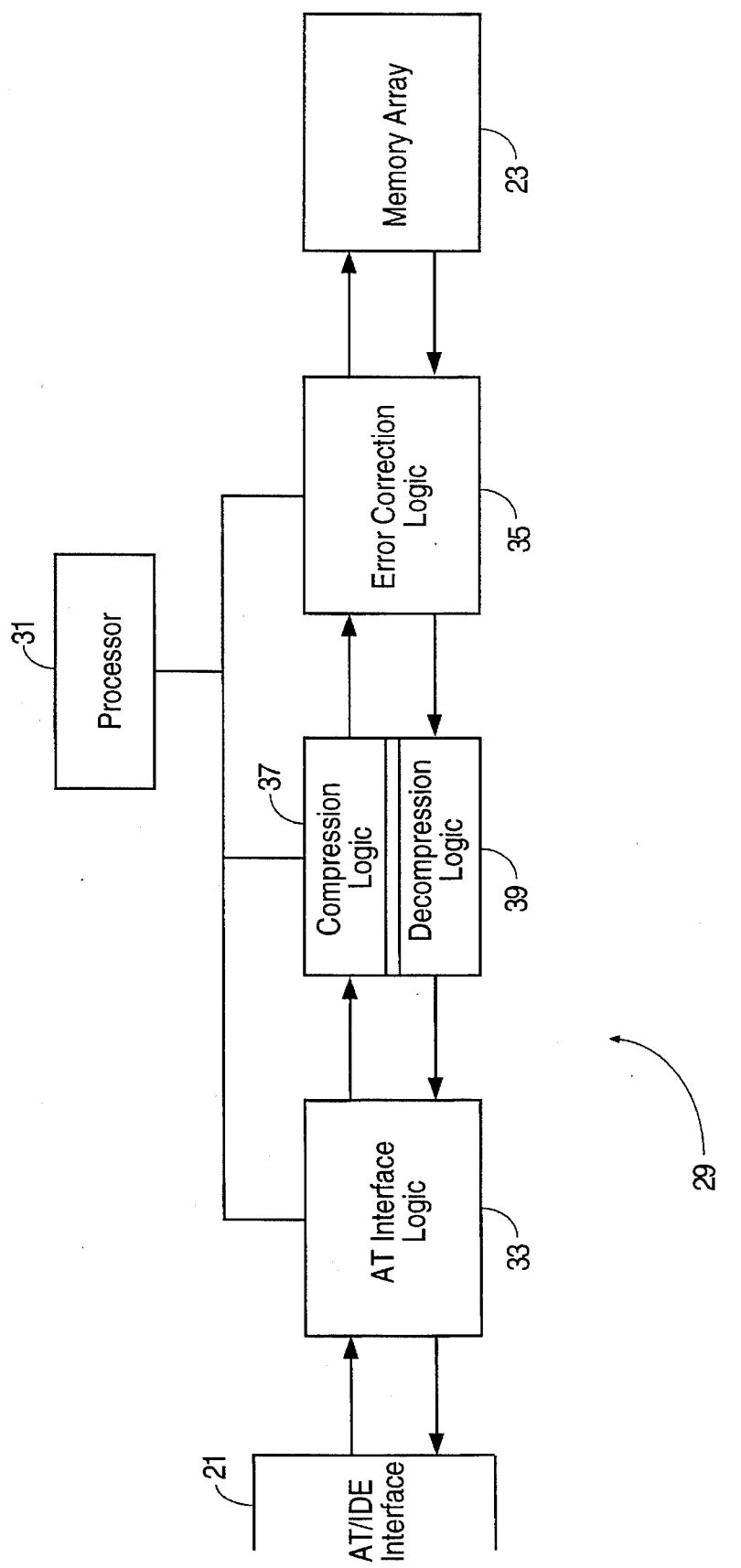
FIG. 2 is a more derailed block diagram of a data flow path portion of the system of FIG. 1.

The physical memory device in the RAM disk of FIG. 1, instead of being a rotating disk, is a memory array 23 composed of semiconductor memory devices such as DRAMs. Power to the memory array is supplied from a battery 25 through a dynamic power management module 27 described in greater detail below. Refresh of the memory array is controlled by a memory controller integrated circuit 29 powered by a battery 25' that may be the same as or different than the battery 25. The memory controller IC also manages memory accesses requested by the host under supervision of the processor 31. The processor 31 controls disk emulation, accomplished by a data mapping algorithm FIG. 2 shows in greater detail a data path portion of the RAM disk of FIG. 1. Access requests from the host interface 21 (for example an AT/IDE interface) are received by an interface logic module 33. The interface logic module 33 forms part of both a control path whereby access requests received from the host interface 21 are communicated to the processor 31 and a data path whereby data is exchanged with the host interface. In a forward direction from the host interface 21 to the memory device 23, data passes through the interface logic module 33, compression logic 37 and error correction logic 35, all under control of the processor 31, to the memory device. In a reverse direction, data from the memory device 23 passes through error correction logic 35, decompression logic 39, and the interface logic module 33, again all under control of the processor 31. The error correction logic 35 performs error correction coding of data being written to the memory device 23 and provides error checking and correction of compressed dam being read from the memory device. The compression logic 37 compresses data being written to the memory device 23, and the decompression logic 39 decompresses data being read from the memory device. As explained in greater detail below, compression efficiency is increased by grouping data blocks into clusters of data blocks having similar characteristics.

Figure 3:
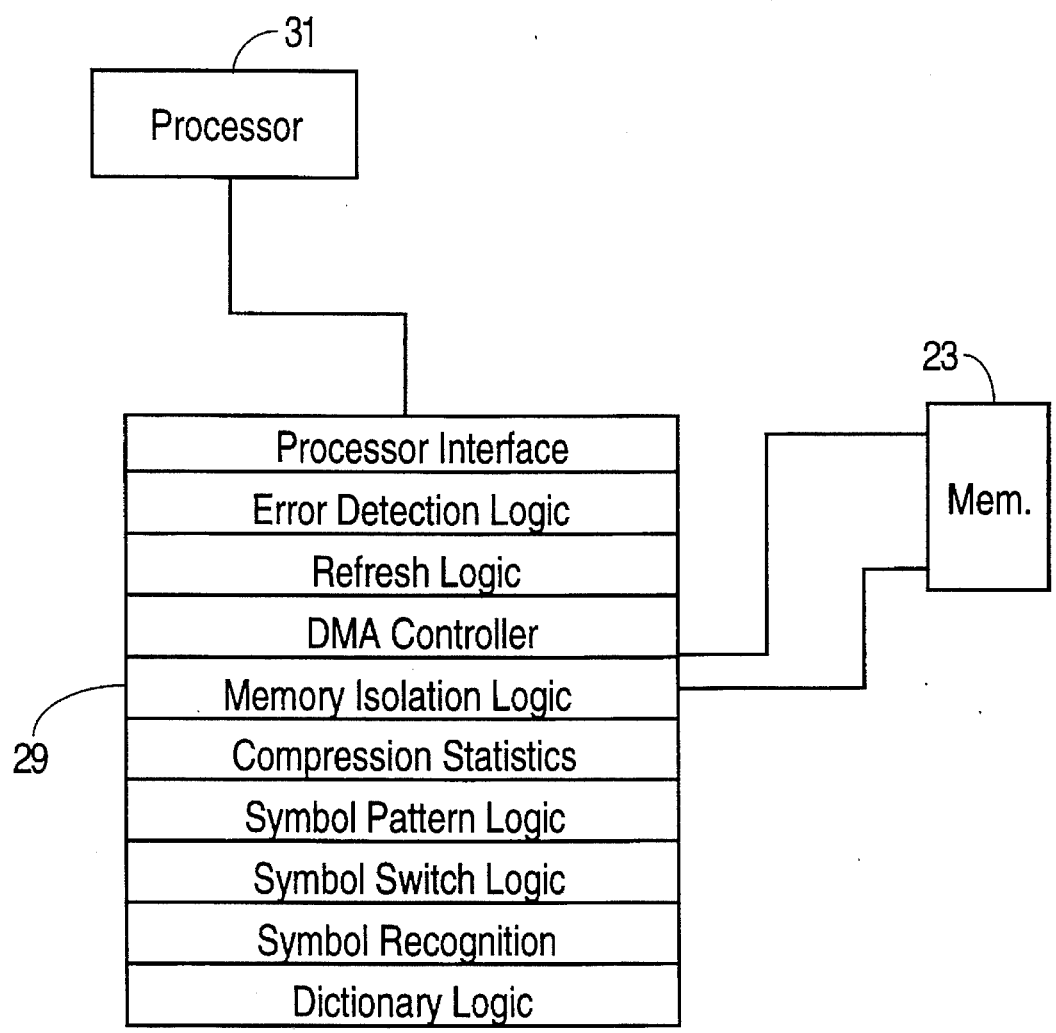
FIG. 3 is a block diagram representing the semiconductor integrated circuit of FIG. 1 in terms of logic functions.

Referring now to FIG. 3, functionally, the memory controller IC 29 may be represented as a collection of logic blocks each of which realizes a different function of the memory controller. A processor interface, or command interface, causes commands received from the memory controller IC to be sent to the processor for processing. Error detection logic performs error correction coding and error detection and correction. Refresh logic performs memory refresh. During periods of access inactivity, the memory controller IC enters a sleep mode in which only refresh logic remains active. Refresh is performed at a lowest possible rate supportable by the memory. A DMA controller supervises transfer of memory blocks between the memory and the host device. Memory isolation logic keeps track of faulty memory locations and causes other memory locations to be used instead. Compression statistics are gathered by the memory controller IC, such as the compressed size of each data block, compression time, compression ratio, how often the block has been accessed, etc. These compression statistics are used to group data blocks together into clusters based on like attributes.

The remaining logic blocks relate to different aspects of the data compression process itself. Data compression causes simple bit information to be examined carefully and systematically in such a way as to generate an abbreviated or translated version of the data. A series of data bits may be viewed as symbols, or a new type of vocabulary. This new vocabulary becomes an abbreviation for the series of bits. The new vocabulary has a dictionary produced by the dictionary logic, and all symbols are translated using this dictionary. Once the dictionary has been assembled, data may then be processed in the alternative format. This new format contains the same information as the original but is abbreviated so as to require less storage space. When the abbreviated data is retrieved, a reverse dictionary is used to translate the abbreviated data to the original format. The data is then returned to the user in its original decompressed form. Variable compression ratios from two to fifteen are attainable depending on the characteristics of the data block. Once the dictionary has been assembled by the dictionary logic, symbol recognition logic identifies symbols as they occur in the data stream and symbol switch logic substitutes for the occurrence of the symbol a more compact representation. In a preferred embodiment, a Ziv-Lempel, DCLZ engine compression system is used. The compression system is implemented in hardware, reducing latency and increasing system throughput. Using this compression system, compression ratios ranging from 2 to 15 and averaging 3 or 4 may be obtained. Assuming a minimum of 3 to 1 compression ratio, Table 1 below gives the number of 4 Mbit or 16 Mbit DRAMs required to store the equivalent amount of data as hard disks of different capacities. Allowance of 20% overhead is made for ECC codes and index tables.

TABLE 1

| Capacity | Number of 4 Mbit DRAMs | Number of 16 Mbit DRAMs |
| --- | --- | --- |
| 20 MB | 17 DRAMS | 5 DRAMS |
| 40 MB | 33 DRAMS | 9 DRAMS |
| 60 MB | 50 DRAMS | 13 DRAMS |
| 80 MB | — | 17 DRAMS |
| 120 MB | — | 25 DRAMS |
| 160 MB | — | 34 DRAMS |

Symbol pattern logic recognizes recurrent symbol patterns, enabling such patterns to be represented more compactly.

Figure 4:
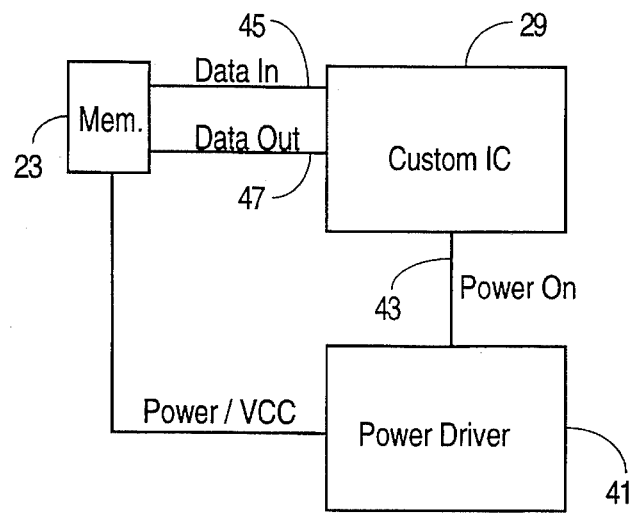
FIG. 4 is a block diagram of a power management portion of the system of FIG. 1 for a single memory device.
Figure 5:
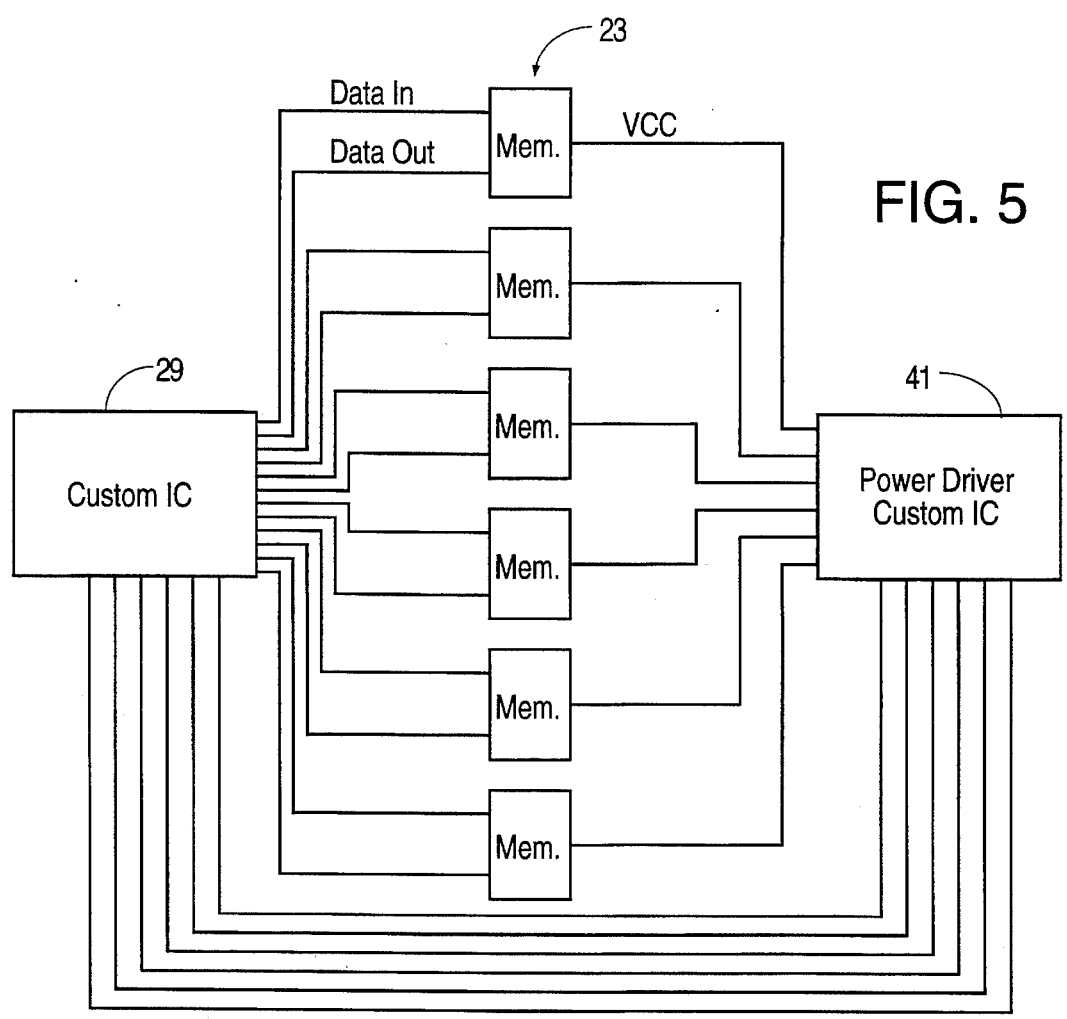
FIG. 5 is a block diagram of the power management portion of the system of FIG. 1 showing power distribution to multiple memory devices.

Referring to FIG. 4, the memory controller IC 29 controls a power driver 41 to cause power supply to the memory 23 to be intelligently managed. The memory controller IC 29 supplies a pulse-width-modulated Power On signal 43 to the power driver 41, causing the power driver to produce a variable voltage VCC for supply to the memory 23. During periods of inactivity, a minimum voltage required to maintain data in the memory is produced. Preceding refresh or data access, the supply voltage is ramped up to a predetermined level and maintained at that level during refresh or data access. At the conclusion of refresh or data access, the supply voltage is again ramped down to a stand-by level. Data inputs 45 and control inputs to the memory are slew-rate controlled by the memory controller IC 29 to further curtail power consumption. In some instances, a lower voltage than specified may be supplied to the memory chips if a longer setup time of the data output 47 is accommodated. The memory controller IC 29 and the power driver IC 41 may be designed to intelligently manage the supply of power to multiple memory devices. In the example of FIG. 5, the memory controller IC 29 and the power driver IC 41 intelligently manage the supply of power to six memory devices. Memory modules of the type shown in FIG. 5 may be daisy chained together to form larger memory systems. Further details of dynamic power management may be found in U.S. application Ser. No. 07/910,213, commonly assigned with the present application and incorporated herein by reference.

Figure 6:
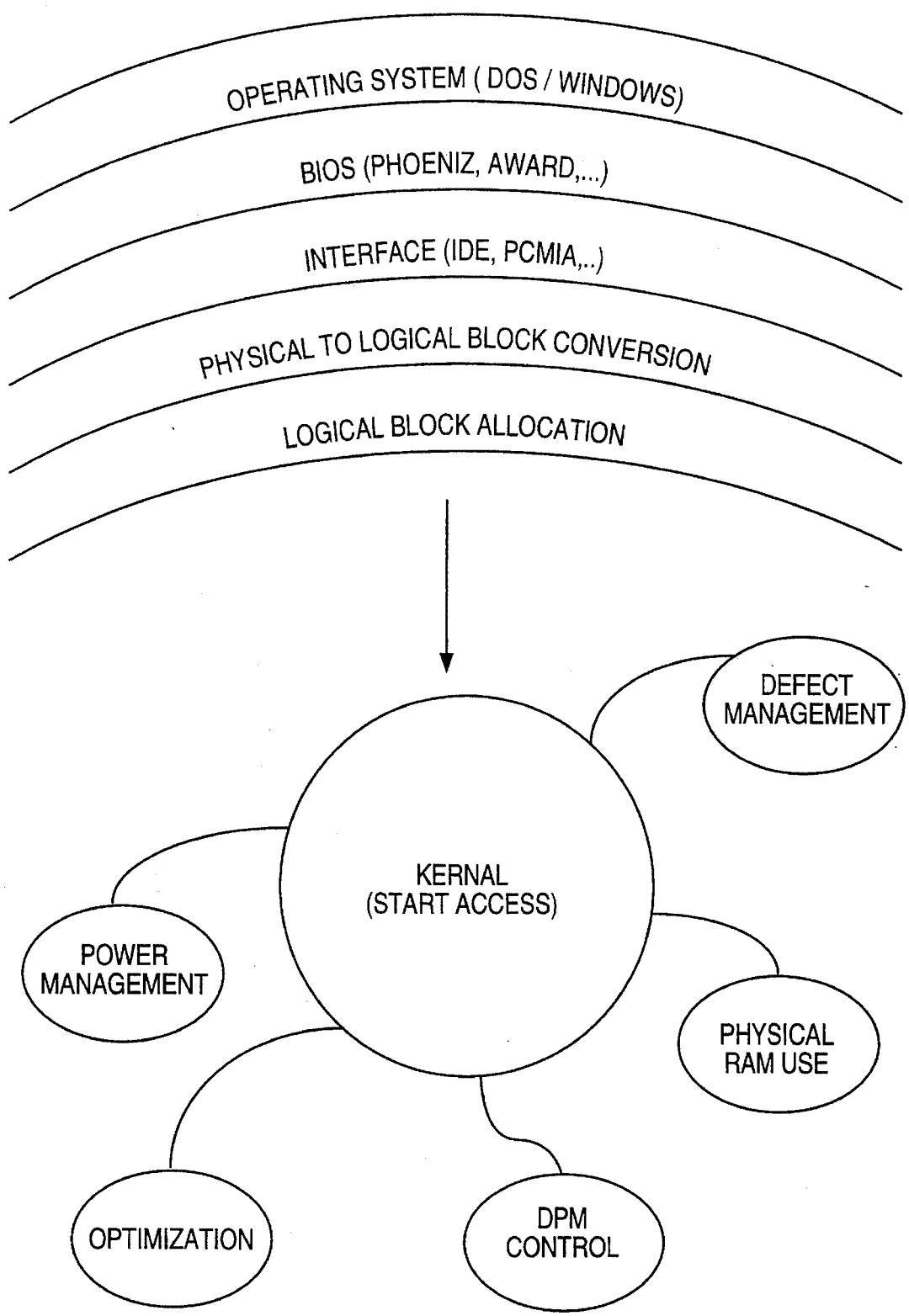
FIG. 6 is a diagram of a software control hierarchy of the system of FIG. 1.

Referring to FIG. 6, the mass memory storage system of FIG. 1 may be represented in terms of a hierarchy of control structures. The mass memory storage system interacts with the Basic Input Output Structure (BIOS) of a computer system. At a next higher level than the BIOS is the computer operating system (for example DOS or Window™) for which application programs are developed. The mass memory storage system maps disk-compatible blocks or records to RAM fragments. The system handles power management, RAM failures, RAM defects and access methods to produce a system that is reliable and efficient. Just underneath BIOS in the hierarchy is the intelligent interface. The host system addresses what it perceives to be a block-addressable rotating memory device in terms of a "sector" on a given "head" and "cylinder". Each block in this case is equal to 512 bytes. The system requests access to the rotating memory device by loading a command table in the intelligent interface with the cylinder number (high byte and low byte), the head number, and the requested sector number. Additionally, the host may request one or more contiguous sectors for transfer. In the RAM disk system, there are no cylinders, heads or sectors in the semiconductor memory. Furthermore, since data compression, memory management and error correction are required to provide the host with error-free data, there is no simple direct memory mapping of 512 byte blocks to corresponding memory addresses. Having received an access command from the intelligent interface, the processor must therefore perform a physical-to-logical block conversion and logical block allocation. Memory access is initiated by a control kernel that invokes various functions as required. Those functions include defect management, physical RAM use, dynamic power management (DPM), optimization, and high-level power management.

Figure 7:
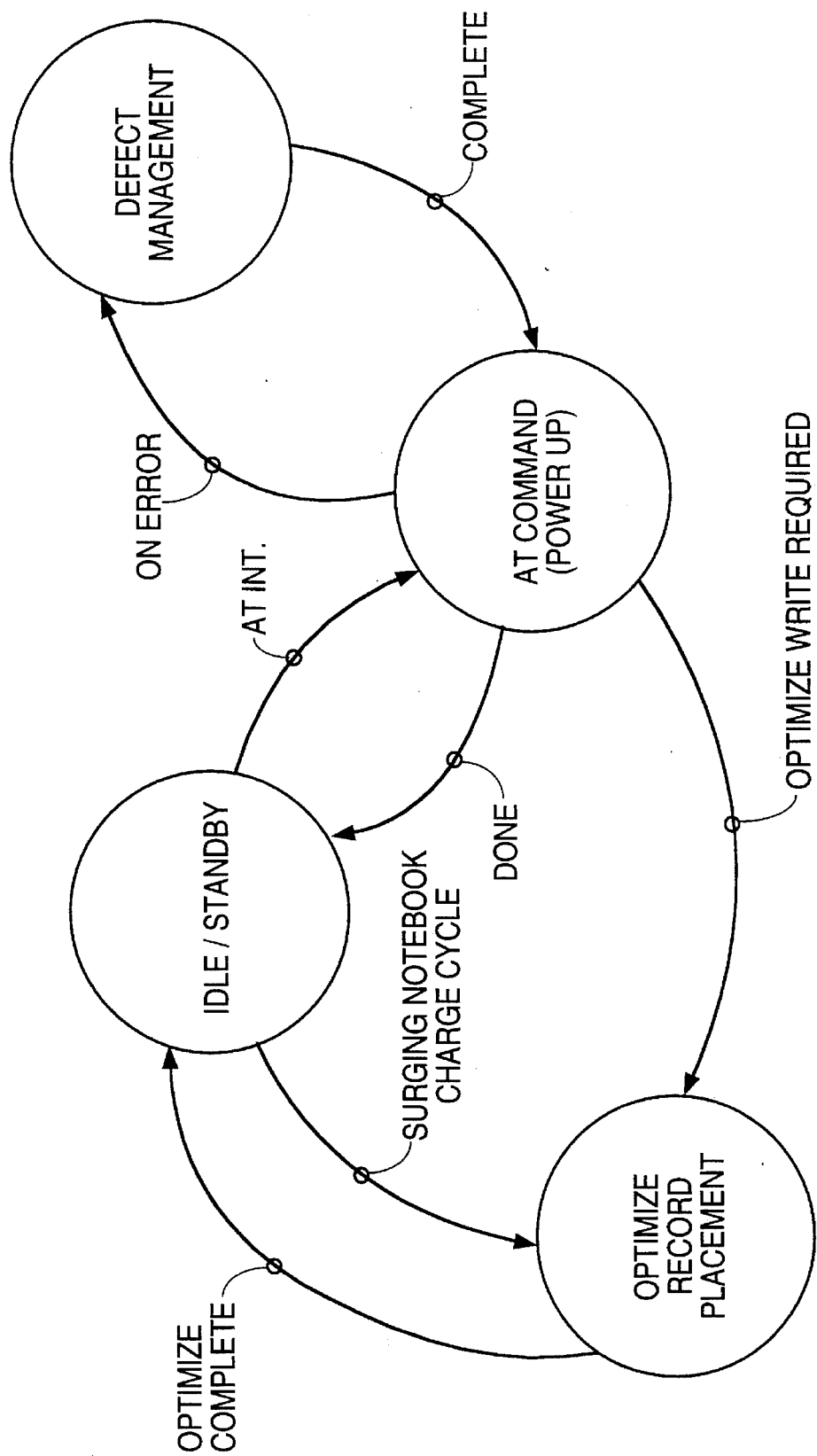
FIG. 7 is a flow diagram of the disk emulation kernel of FIG. 6.

Referring to FIG. 7, operation of the control kernel may be represented in terms of four operating states. Upon completion of a current task, the system always enters an idle/standby state in which all RAMs are refreshed in accordance with dynamic power management. A microcontroller inside the memory controller IC goes to sleep waiting for a nonmaskable interrupt from the intelligent interface. When such an interrupt occurs, the microcontroller in the memory controller IC is powered up and an AT command state is entered. In response to the command from the intelligent interface, a read or write operation is performed. If an error occurs, a defect management state is entered in which the error is corrected if possible. When defect management has been completed, the AT command state is reentered. When the command has been successfully performed, the system returns to the idle/standby state. If performance of the command requires an optimize write operation, then an optimize record placement state is entered. When record placement has been optimized, the system returns to the idle/standby state. The optimize record placement state is entered periodically from the idle/standby state as a background task in accordance with a surging notebook charge cycle. As described more fully in the previously-referenced application, pulse-width control of power supplied to the memory chips results in a surging power cycle during standby. During peak periods of the surging power cycle, power is sufficient to read from and write to the memory in order to optimize record storage. During low periods of the surging power cycle, power is insufficient to read from and write to memory.

Figure 8A:
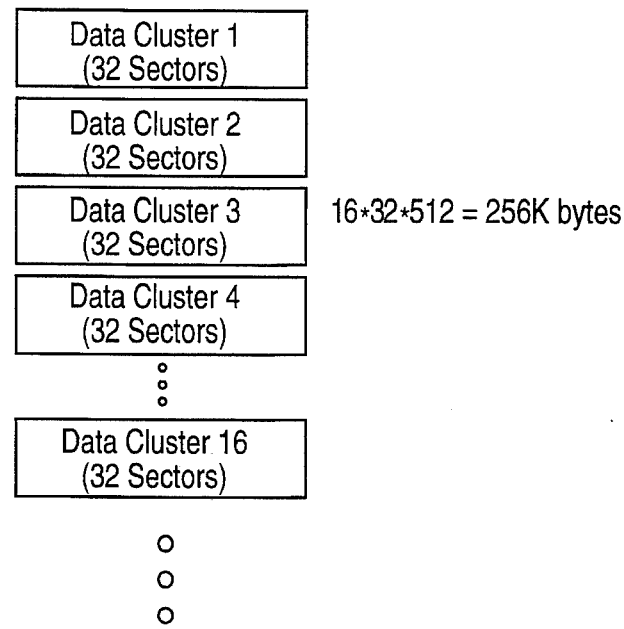
FIGS. 8(a) and (b) each is a diagram of a data structure for storing compressed data in the RAM disk system of FIG. 1.
Figure 8A:
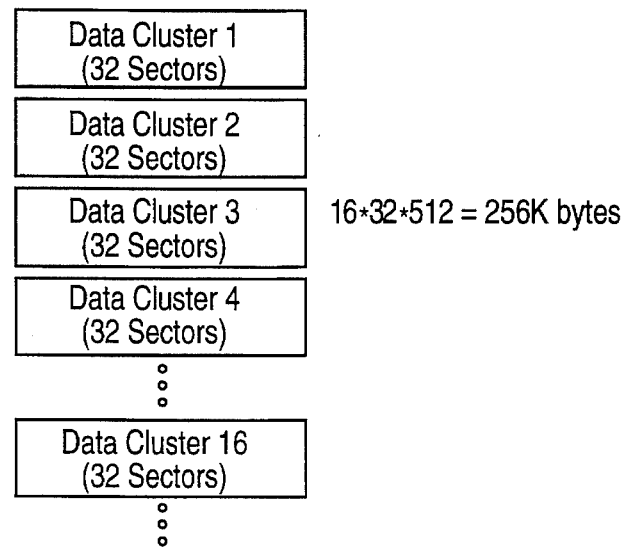

Referring to FIG. 8(a), each 512-byte data sector is grouped with other data sectors having similar characteristics (from a data compression standpoint) to form data clusters of 32 sectors each. Sixteen data clusters having broadly similar characteristics are grouped together to form a record. Each record therefore contains 16×32×512=256K bytes of data. The records are indexed to form a solid-state memory file system for compressed data. Each record has a table including information about the contents of the overall record and information about the contents of each cluster in the record. The data record size is variable, since the data compression algorithm actually varies the data record byte length. The compression ratio varies from 1.0 to 15.0. The variable size of data records in semiconductor memory is carefully managed by the control processor 31 (FIG. 1) in a byte-addressable manner.

Figure 8B:
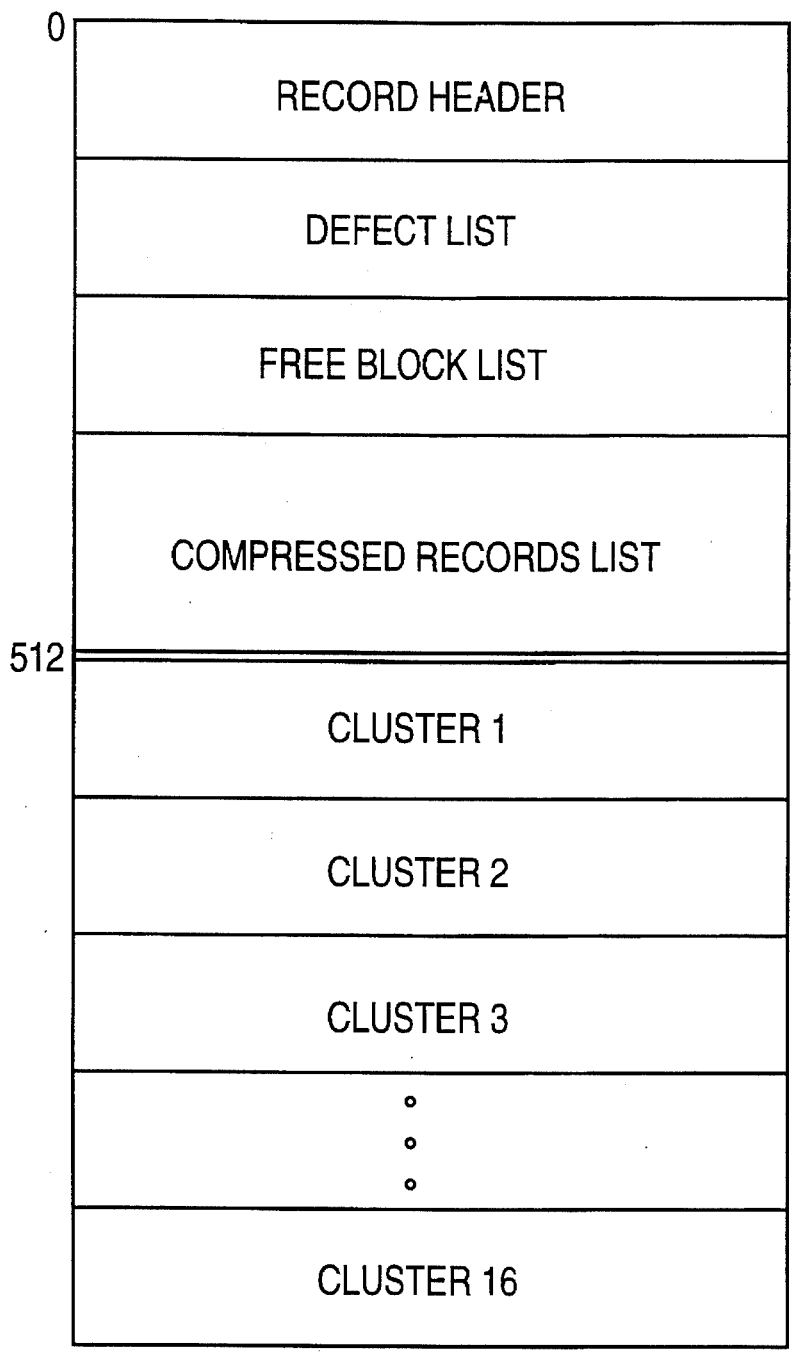

The structure of an individual record is shown in greater detail in FIG. 8(b). An initial 512-byte portion of the record includes a record header, a defect list, a free block list, and a compressed record list. The record header identifies the top of the record, the start of the defect map, and the most likely types of data in the clusters. The defect list identifies bit defects in the clusters. The free block list identifies the free block length in bytes in each cluster. As clusters are repeatedly optimized in a manner later described, storage efficiency increases, opening up memory space in the clusters. The memory space occurs as a free block at the end of the cluster. The lengths of each of these free blocks are entered in the free block list.

Further details of the record definition are presented in Table 2:

TABLE 2

| | |
|---|---|
| Byte 0,1: | Record #0, . . . 65K |
| Byte 2: | Record type: 0, . . . 256 |
| Byte 3: | Defect List Flag: 11111111 - FF |
| Byte 4,5,6: | Defect Location from Byte 0 |
| Byte 7: | Length of Defect |
| . | |
| . | |
| . | |
| Byte 28,29,30: | Defect Location from Byte 0 |
| Byte 31: | Length of Defect |
| Byte 32,33: | Free Block Length in Bytes Cluster 1 |
| . | |
| . | |
| . | |
| Byte 62,63: | Free Block Length in Bytes Cluster 16 |
| Byte 64,65,66: | LBN for Block Saved |
| Byte 67: | Number of Contiguous Sectors Saved |
| Byte 68,69,70: | Actual Length in Bytes |
| Byte 71: | Flag Byte (Reserved) |
| . | |
| . | |
| . | |
| Byte 504,505,506: | LBN for Block Saved |
| Byte 507: | Number of Sectors Saved |
| Byte 508,509,510: | Actual Length in Bytes |
| Byte 511: | Flag Byte (Reserved) |

Bytes 0 and 1 identify the record number, byte 2 identifies the record type, and byte 3 is a defect list flag. Each bit of the defect list flag identifies the possible existence of a memory defect error. If none of the bits is set, the area of memory containing the record is defect-free. For each bit in the defect list flag, four bytes are provided in the defect list. Three bytes give the defect location from byte 0. The last byte gives the length of the defect. The free block list portion of the record contains two bytes for each of the clusters in the record, indicating the free block length for that cluster. Finally, the compressed record list provides eight bytes for each data unit. Three bytes give the logical block number (LBN) of a sector saved in the record, the fourth byte gives the number of contiguous sectors saved, and the fifth, sixth and seventh bytes give the actual length in bytes of the data unit. The eight byte is reserved. The compressed record list may contain up to 56 entries if required. The foregoing arrangement assumes that data is handled in data units (blocks) of 8 or 16 sectors, as is typically the case.

In effect, the kernel implements the equivalent of a disk operating system of a type described, for example, in *The Design and Implementation of the 4.3BSD UNIX®Operating System* by Leffler, McKusick, Karels and Quarterman (Addison-Wesley), in particular Chapter 7 thereof, incorporated herein by reference as background material only. Further background information may be found in Intel Corporation's *Memory Products Handbook* (1991), in particular Chapters 3 and 4, also incorporated herein by reference.

Figure 9:
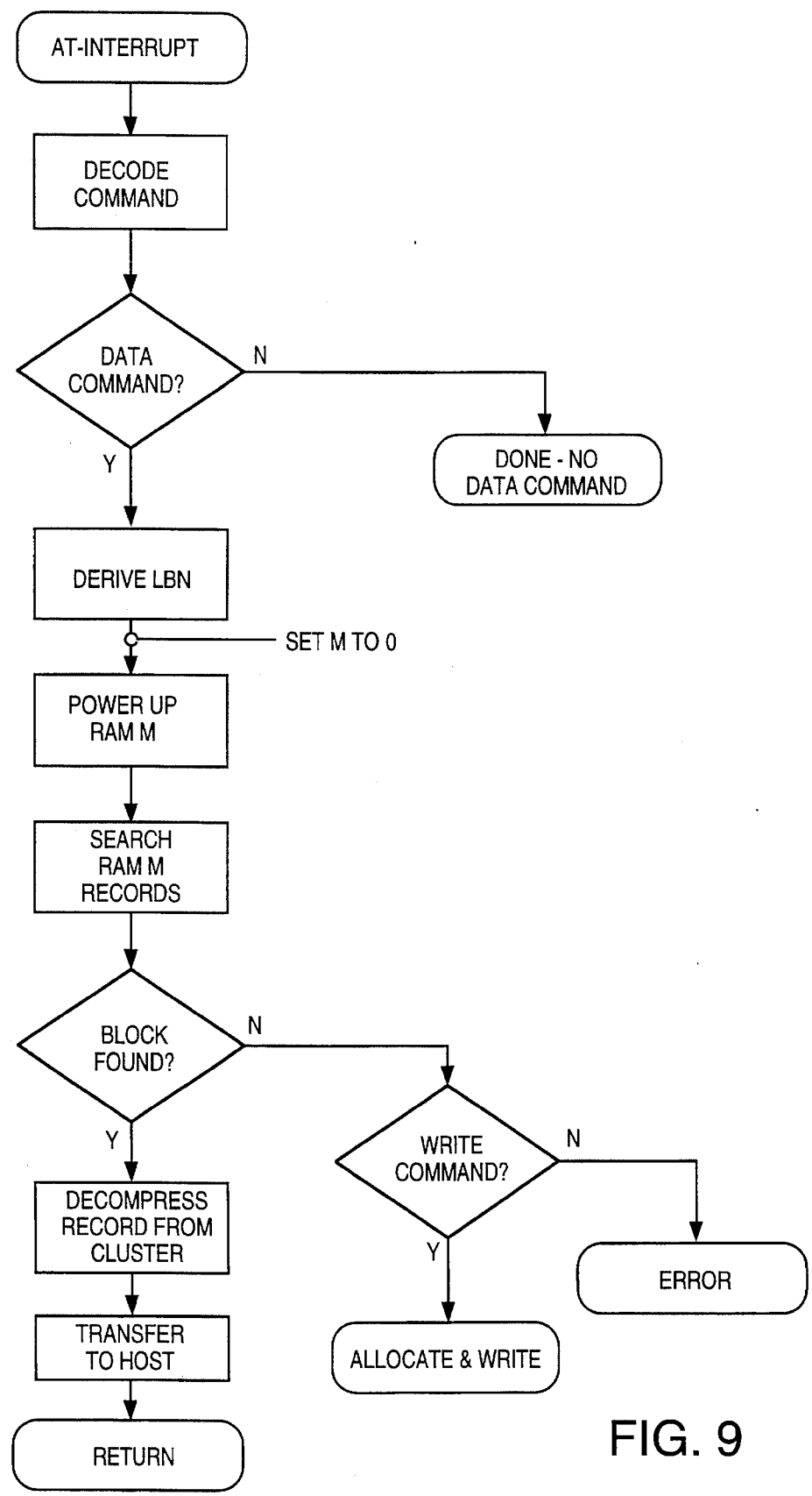
FIG. 9 is a flow chart of a routine executed upon receipt of an interrupt from the host interface in FIG. 1.

With the foregoing background, the manner in which disk emulation is carried out will be described in relation to the flow-charts of FIGS. 9–12, 14 and 16. Referring to FIG. 9, upon receipt of an interrupt from the intelligent interface, the interrupt command is decoded to determine whether or not it is a data command. If not, no disk emulation is required. If the command is a data command, then a logical block number corresponding to the first requested sector is derived. In the case of a 40 megabyte hard drive for example, having twelve tracks per cylinder and sixteen sectors per track, the host address is translated to a logical block number in the following manner:

CYL1 * 12 (tracks per cylinder) * 16 (sectors per track) +
HD1 * 16(sectors per track) +
SECT =
―――――――――――――――――――――
LBNL1

(LBN1 is 24 bits in length)

Each of the RAM chips is then powered up in turn, and the records stored in each RAM chip are searched in an effort to locate the logical block. If the block is found, then the cluster containing the block is decompressed and the block is then transferred to the host. If the block is not found, then the program determines whether or not the command is a write command. If the command is not a write command, then an error is indicated. If a command is a write command, then an allocate and write subroutine, to be described in conjunction with FIG. 10, is entered.

Figure 10:
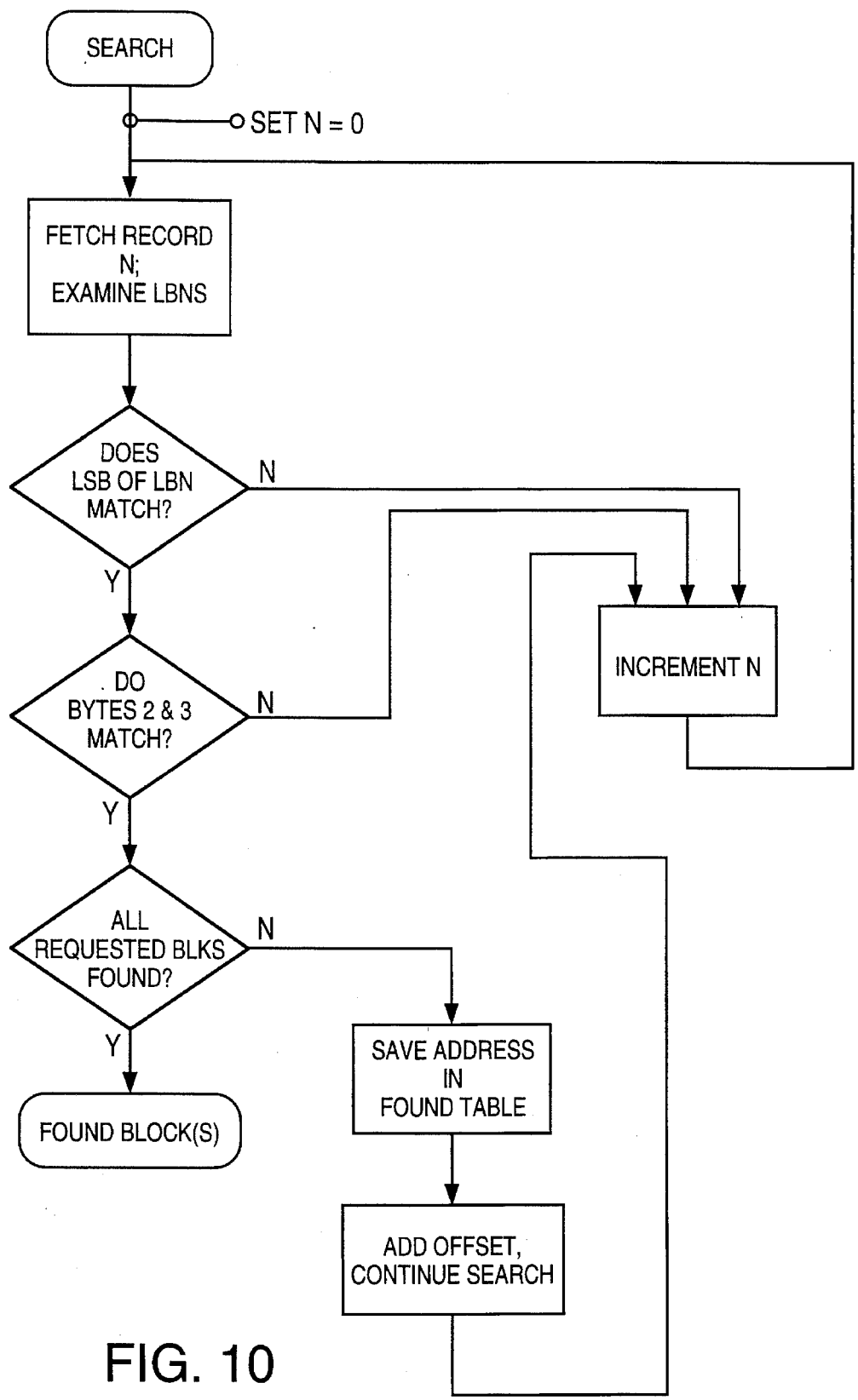
FIG. 10 is a flowchart of a search subroutine.

Within a particular RAM, a logical block designated by the LBN is sought in accordance with the search routine of FIG. 10. A record counter N is initialized to 0, after which the first record in the RAM, Record 0, is fetched and the LBNs contained therein are examined. The least significant byte of each LBN is compared with the least significant byte of the LBN (or any of multiple LBNs) being sought. If a match is found, the second and third bytes are compared. If no match of all three bytes is found, the record counter N is incremented and the next record in the RAM fetched and searched. If a match is found, the requested logical block, or at least one of the requested logical blocks has been found. If additional blocks have been requested, the address of the logical block already located is saved in a Found Table. The remaining LBNs in the current record are examined in search of the logical blocks remaining to be found. If not all of the requested blocks have been found after searching the current record, an address offset is used to locate the next record, and the search continues by incrementing the record counter N and fetching the next record. As the records are searched, a cache may be maintained containing a map of the records most recently searched. On a subsequent request, if the requested data is stored in the records most recently searched, then the information in the cache allows the requested data to be directly retrieved.

Figure 11:
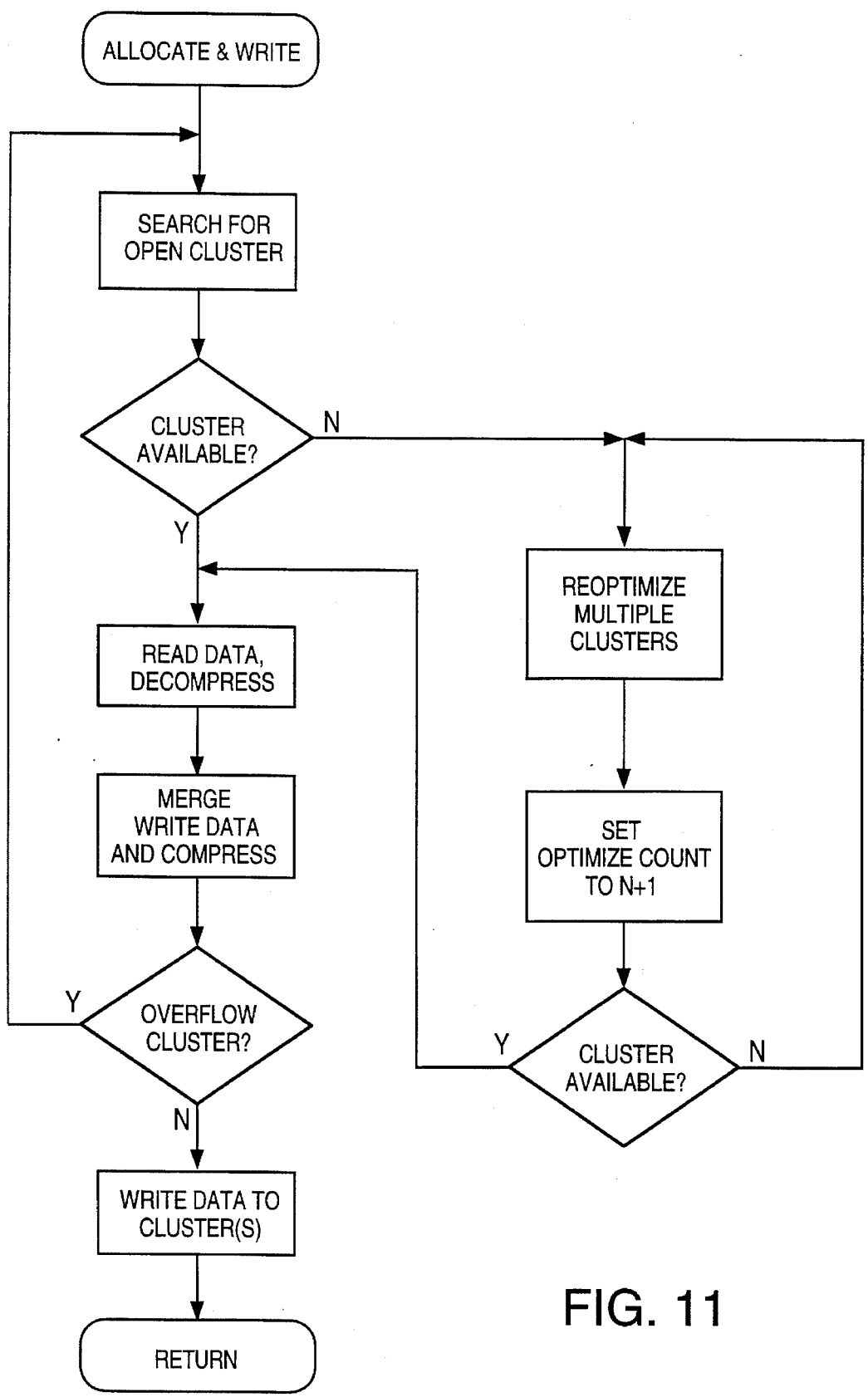
FIG. 11 is a flowchart of an allocate and write subroutine.

Referring now to FIG. 11, to perform an allocate and write operation, a memory allocation table is first searched for an "open" cluster, i.e. a cluster having available contiguous memory space and fewer than 32 compressed sectors. If a cluster is available, the cluster data is read and decompressed. The write data is then merged with the decompressed data and the merged data is compressed. Writing a pre-compressed block size of 32 sectors improves the compression ratio by writing many contiguous sectors to memory. If the merged compressed data occupies more space than is available to the cluster, then cluster overflow occurs, and the search continues for an open cluster having more available memory space. If the merged compressed data fits within the cluster, then the data is written to the cluster, and the operation concludes. If no available cluster is found, then multiple clusters are reoptimized in an attempt to achieve further compression, and an optimized count is incremented. Reoptimization continues up to a predetermined number of times until a cluster becomes available.

Figure 12:
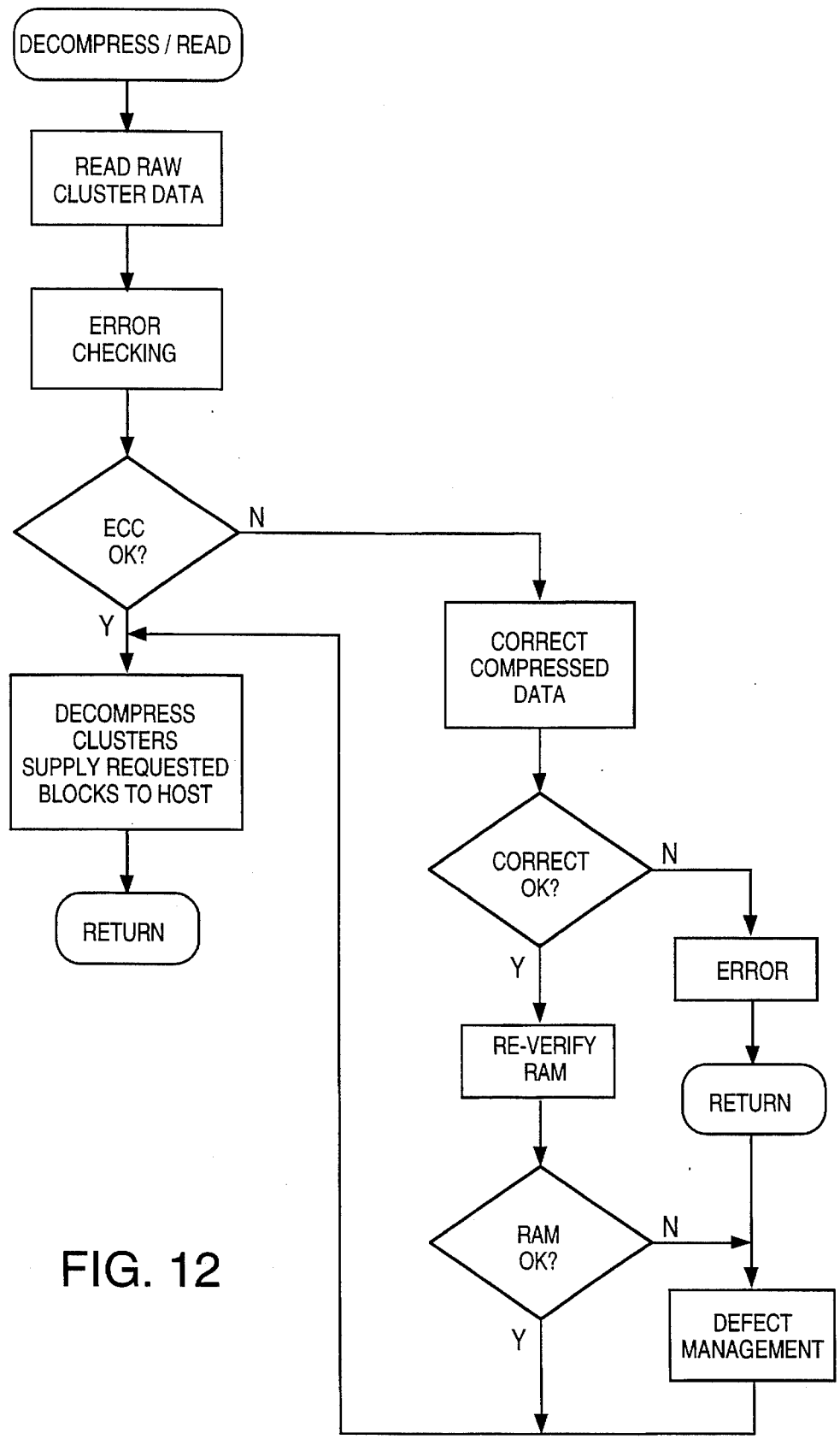
FIG. 12 is a flowchart of a decompress/read subroutine.

Referring to FIG. 12, once the requested logical blocks have been found, a decompress/read operation, is performed by first reading the raw cluster data and then performing error checking of the data. If no error is found, the clusters are decompressed, and the requested blocks are supplied to the host. Note that error checking and correction is performed on compressed data rather than on uncompressed data in order to increase the error correction span. If an error is found, the compressed data is corrected if possible. If correction is not possible, an error is signalled. If, on the other hand, correction is possible, then the RAM from which the incorrect data was read is re-verified by writing to and reading back from the RAM a pattern of 1s and 0s (for example, a "walking-ones" pattern). If the RAM passes the test, then operation proceeds by decompressing the clusters and supplying the requested blocks to the host. If the RAM fails the test, then a defect management routine is first performed before decompressing the clusters and supplying the requested blocks to the host.

Figure 13:
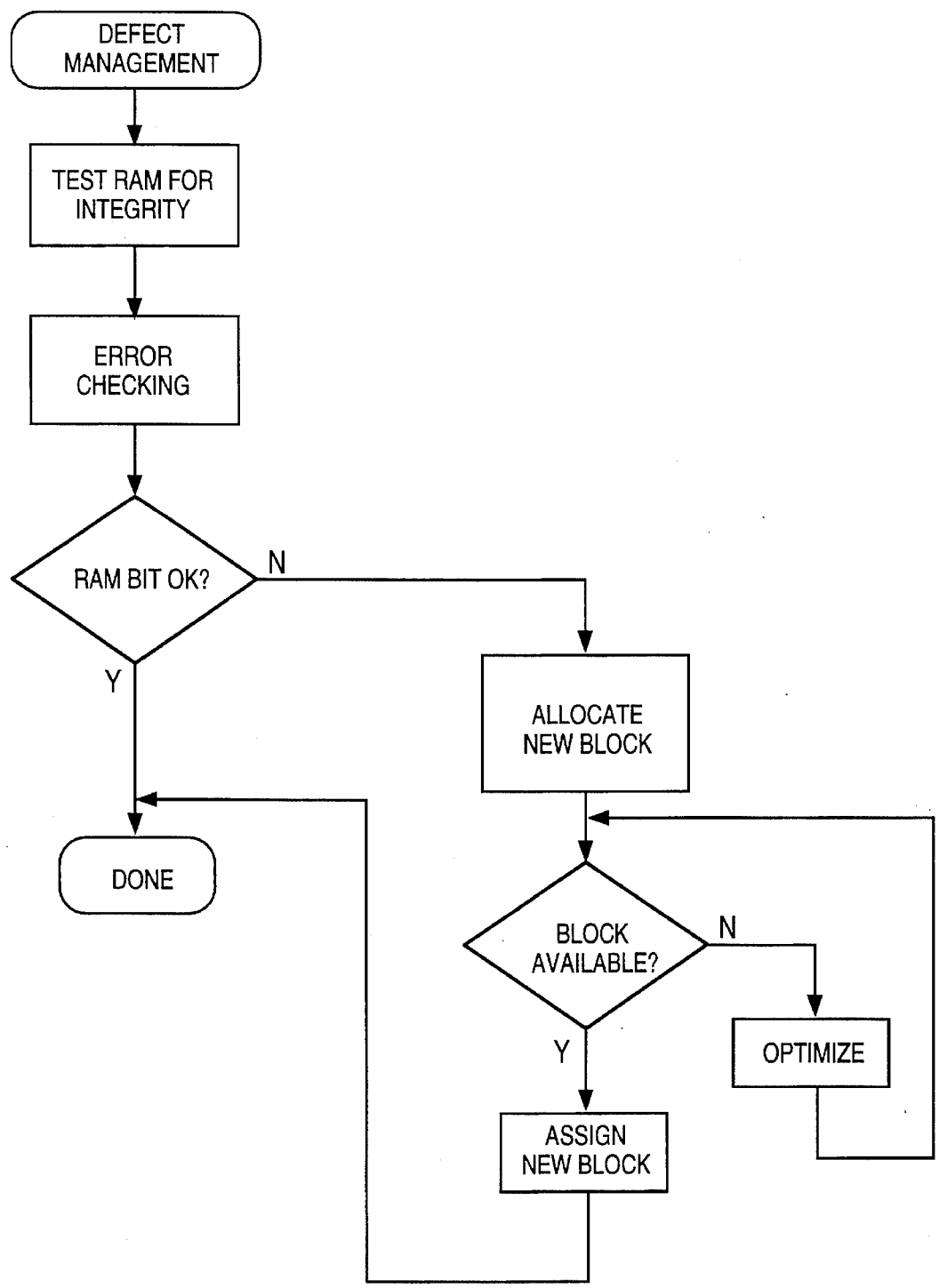
FIG. 13 is a flowchart of a defect management routine.

The defect management routine is illustrated in FIG. 13. First, an integrity test of the suspect RAM is performed, followed by the normal error checking procedure. If the RAM produces correct dam, then the routine concludes. Otherwise, the logical block affected is remapped to a different RAM device or a different area of RAM. First an attempt is made to allocate a new block. If a block is available, the logical block affected is assigned and written to the new block. If a block is not available, then an optimize routine is performed to free up additional memory space.

Figure 14A:
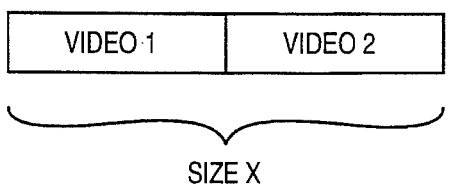
FIGS. 14a, 14b, and 14c each is a diagram representing the effect of an optimize routine.
Figure 14B:
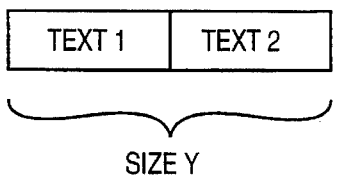
Figure 14C:
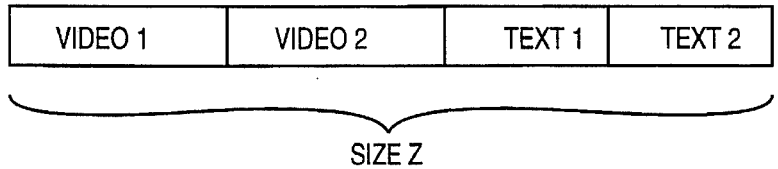

The effect of the optimize routine may be appreciated with reference to FIGS. 14*a*, 14*b*, and 14*c*. In FIG. 14*a*, two files each containing video information are associated together and together have a size in memory denoted by the letter X. In FIG. 14*b*, two files each containing text information are associated together and together occupy space in memory of a size Y. Based on compression statistics, the optimize routine may attempt to cluster together the two groups of files. The size of the resulting cluster is designated by the letter Z. If Z<X+Y, then the optimize routine has been successful and the trial clustering is made permanent in memory.

Figure 15:
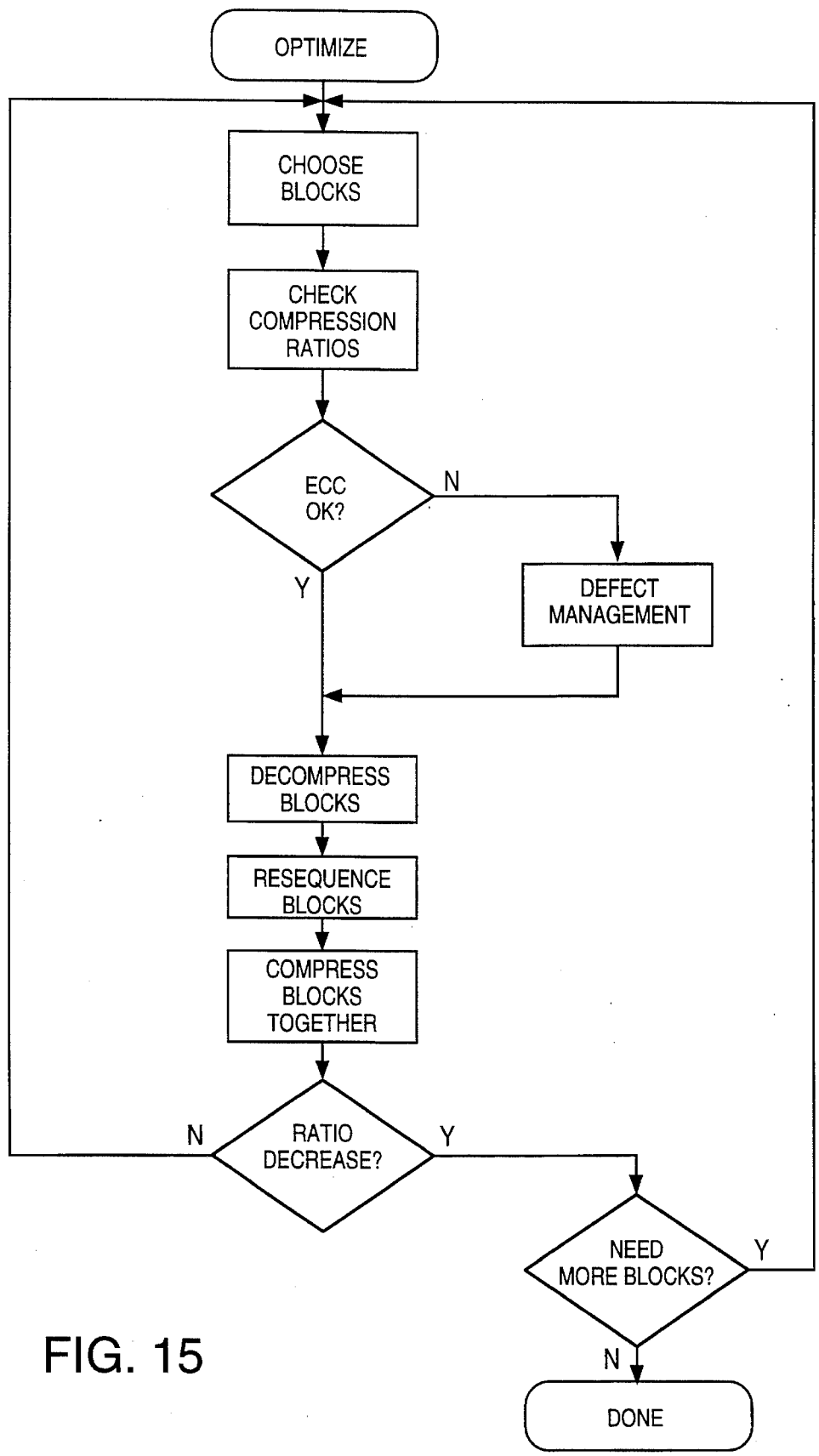
FIG. 15 is a flow chart of the optimize routine.

The optimize routine is shown in FIG. 15. First, blocks are chosen for trial clustering and their compression ratios are checked to determine the likelihood of obtaining additional compression efficiency by clustering the blocks. The blocks are read and checked for errors. If errors are detected, defect management is performed. The blocks are then decompressed, reordered and compressed together using a new compression dictionary. If the compression ratio of the combined blocks is greater than their separate compression ratios, then the optimize routine has been successful, and a determination is made whether sufficient blocks have been freed up or if more blocks are still needed. If more blocks are required, then the optimized routine repeats. If no increase in the compression ratio is obtained, then different blocks are chosen and the optimize routine repeated until a compression ratio increase is obtained.

To increase robustness and the assurance of error-free data, in a preferred embodiment each sector, instead of being stored in a single memory chip, is split in a predictable way between multiple chips, the amount of sector data being stored in a given chip being determined by an error correction span of the error correction code employed. Assuming use of an 88-bit Reed Solomon code on a 512-byte sector, for example, the error correction span is sufficient to allow 128 bytes to be stored together and to be recreated in case of device failure. Error correction bits are stored in a separate memory device apart from data bytes being protected. An exemplary physical mapping of 10 sectors S0 to S9, together with their error correction codes, to a semiconductor memory composed of five RAM devices is shown in Table 3. Five 4Mbit DRAMs are sufficient to emulate a 20 MB hard disk.

TABLE 3

| RAM1 | RAM2 | RAM3 | RAM4 | RAM5 |
|---|---|---|---|---|
| S0 I | S0 II | S0 III | S0 IV | ECC/S0 |
| S1 I | S1 II | S1 III | ECC/S1 | S1 IV |
| S2 I | S2 II | ECC/S2 | S2 III | S2 IV |
| S3 I | ECC/S3 | S3 II | S3 III | S3 IV |
| ECC/S4 | S4 I | S4 II | S4 III | S4 IV |
| S5 I | S5 II | S5 III | S5 IV | ECC/S5 |
| S6 I | S6 II | S6 III | ECC/S6 | S6 IV |
| S7 I | S7 II | ECC/S7 | S7 III | S7 IV |
| S8 I | ECC/S8 | S8 II | S8 III | S8 IV |
| ECC/S9 | S9 I | S9 II | S9 III | S9 IV |

Section I = Bytes 0 to 127
Section II = Bytes 128 to 255
Section III = Bytes 256 to 383
Section IV = Bytes 384 to 511

The error correction code for sector N is stored in RAM [5(1+N mod 5) −N], and the four 128-byte sections I–IV are stored in order beginning with the lowest available RAM. In the case of sector S5, for example, ECC/S5 is stored in RAM [5(1+5 mod 5)−5]=RAM 5. Sections I, II, III and IV are stored in RAM1, RAM2, RAM3 and RAM4, respectively. To take another example, ECC/S9 is stored in RAM [5(1+9 mod 5)−9]=RAM1. Sections I, II, III and IV of sector S9 are then stored in RAM2, RAM3, RAM4 and RAM5, respectively. From a sector's LBN and starting address, addresses for each of the sector's sections and its ECC bits may be easily derived.

The aforedescribed memory system provides a mass storage device that interacts with system BIOS of a computer system and implements a mapping of disk-compatible blocks or records to RAM fragments. The system handles power, RAM failures, RAM defects, and data access, resulting in a system that reliably and efficiently manages data. The system therefore provides a practical, cost-effective and high-performance solution to the problem of providing mass storage for notebook computers. By replacing a conventional hard disk drive with a memory system based on semiconductor devices, shock and vibration tolerance are increased, power consumption is decreased, and access latencies are decreased. Using the disclosed data compression and disk emulation techniques, the price of the semiconductor memory system may be reduced to levels at or below comparable hard disks.

Although the preferred embodiment has been described as using DRAM semiconductor memories, the invention is broadly applicable to memories including EEPROM, F-EEPROM, SRAM and DRAM. Therefore, although the foregoing has described the principles, preferred embodiments and modes of operation of the present invention, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method of storing data in and reading data from a memory system, composed of a plurality of semiconductor memory integrated circuits, in units of data commonly exchanged with a rotating memory device, comprising the steps of, to store one or more units of data:

reading a cluster of units of data stored in said memory system;

decompressing said cluster of units of data into a multiplicity of other units of data;

merging said one or more units of data with said multiplicity of other units of data to form a decompressed cluster of units of data;

compressing said decompressed cluster of units of data by data compression to produce a compressed cluster of units of data;

performing error correction coding of said compressed cluster of units of data to form a coded cluster of units of data; and storing said coded cluster of units of data in fragments in said memory system, each fragment including a multiplicity of data bits and being of a length of no greater than an error correction span of an error correction code used in said error correction coding, contiguous fragments of said coded cluster of units of data being stored in separate memory integrated circuits.

2. The method of claim 1, further comprising the steps of, to read one or more units of data:

searching said memory system for fragments of a stored compressed cluster of units of data including one or more units of data;

reading said fragments of said stored compressed cluster of units of data from said memory system and ordering said fragments to form said stored compressed cluster of units of data;

performing error correction of said stored compressed cluster of units of data to form a corrected compressed cluster of units of data;

decompressing said corrected compressed cluster of units of data to form one or more units of decompressed data; and providing said one or more units of decompressed data to a host device.

3. An apparatus for storing data in and reading data from a memory system, composed of a plurality of semiconductor memory integrated circuits, in units of data commonly exchanged with a rotating memory device, the apparatus comprising:

means for reading a cluster of units of data stored in said memory system;

means for decompressing said cluster of units of data into a multiplicity of other units of data;

means for merging said one or more units of data to be stored with said multiplicity of other units of data stored in said memory system to form a decompressed cluster of units of data;

data compression means for compressing said decompressed cluster of units of data to produce a compressed cluster of units of data;

error correction coding means for performing error correction coding of said compressed cluster of units of data; and means for storing said compressed cluster of units of data in said memory system, a multiplicity of contiguous data bits of the compressed cluster of units of data being stored in a single memory integrated circuit.

4. The apparatus of claim 3 further comprising:

means for searching said memory system for a compressed cluster of units of data including one or more units of data to be read;

means for reading said compressed cluster of units of data from said memory system;

data decompression means for decompressing said compressed cluster of units of data; and means for providing said one or more units of data decompressed by said data decompression means to a host device.

5. The apparatus of claim 4 wherein said means for providing one or more units of data to a host device is adapted to interface with one of an Industry Standard Architecture, Small Computer System Interface, and a Personal Computer Memory Card Interface Association interface.

6. The apparatus of claim 4 wherein said memory integrated circuits are DRAMs.

7. The apparatus of claim 6 further comprising a dynamic power management device for supplying power to said DRAMs to curtail power consumption of said DRAMs.

8. The apparatus of claim 7 further comprising a battery power source from which said dynamic power management device supplies power to said DRAMs for non-volatile operation of said DRAMs.

9. The apparatus of claim 3, further comprising a housing having a form factor in accordance with the International Standards Organization form factor for a removable 1.8 inch disk drive unit and provided with an edge connector, said means for clustering coupled to said edge connector of said housing and receiving said one or more units of data to be stored from a host coupled to said edge connector.

10. The apparatus of claim 3, further comprising means for detecting a faulty location in a memory integrated circuit and remapping part of the compressed data stored in said memory integrated circuit to another location in a memory integrated circuit.

11. The apparatus of claim 3, further comprising means for optimizing said memory system to provide sufficient memory space to store said units of data to be stored in said memory system.

12. The structure of claim 3 wherein said data compression means comprises a Ziv-Lempel, DCLZ engine compression system.

13. An apparatus for transferring data between a processor and a memory, said memory comprising a plurality of semiconductor memory integrated circuits, said apparatus comprising:

means for locating available memory space in said memory to store in said memory a unit of data transmitted by said processor;

means for reading a cluster of units of data stored in said memory;

means for decompressing said cluster of units of data into a multiplicity of other units of data;

means for merging said unit of data transmitted by said processor with said multiplicity of other units of data to form a decompressed cluster of data;

means for compressing said decompressed cluster of data to form a compressed cluster of data;

means for error correction coding said compressed cluster of data to form a coded cluster of data; and means for storing said coded cluster of data in a plurality of fragments in said memory, wherein said apparatus and said memory emulate a rotating memory device.

14. The apparatus of claim 13, further comprising means for optimizing said memory system when said means for locating fails to locate sufficient available memory space to store said data transmitted by said processor.

15. The apparatus of claim 13, wherein contiguous fragments of said plurality of fragments are stored in a separate memory integrated circuit of said memory, each fragment of said plurality of fragments being no greater in length than an error correction span of an error correction code used by said means for error correction coding.

16. The apparatus of claim 13, further comprising:

means for searching in said memory data fragments containing a unit of requested data, said processor requesting said unit of data from said memory;

means for reading said fragments from said memory and ordering said fragments to form a coded cluster of requested data;

means for performing error correction on said coded cluster of data to form a compressed cluster of requested data;

means for decompressing said compressed cluster of requested data to form a cluster of requested data containing said unit of requested data; and means for providing said unit of requested data to said processor.

17. A method for transferring data between a processor and a memory emulating a rotating memory device, said memory comprising a plurality of semiconductor memory integrated circuits, said method comprising the steps of:

locating available space in said memory to store in said memory a unit of data transmitted by said processor;

reading a cluster of units of data stored in said memory;

decompressing said cluster of units of data into a multiplicity of other units of data;

merging said unit of data transmitted by said processor with said multiplicity of other units of data to form a decompressed cluster of data;

compressing said cluster of data to form a compressed cluster of data;

error correction coding said compressed cluster of data to form a coded cluster of data; and storing said coded cluster of data in a plurality of fragments in said memory.

18. The method of claim 17, wherein said step of storing further comprises the step of storing contiguous fragments of said plurality of fragments in a separate memory integrated circuit of said memory, each fragment of said plurality of fragments being no greater in length than an error correction span of an error correction code used by said means for error correction coding.

19. The method of claim 17, further comprising the steps of:

searching in said memory for fragments containing a unit of requested data, said processor requesting said unit of data from said memory;

reading said fragments from said memory and ordering said fragments to form a coded cluster of requested data;

performing error correction on said coded cluster of data to form a compressed cluster of requested data;

decompressing said compressed cluster of requested data to form a cluster of requested data containing said unit of requested data; and providing said unit of requested data to said processor.

20. The method of claim 19, wherein said memory is organized in data structures comprising a plurality of records each comprising a plurality of clusters, each record of said plurality of records including a table containing data identifying each unit of data stored in that particular record.

21. The method of claim 20, wherein said step of searching further comprises the step of reading said table of a record and comparing the data identifying each unit of data stored in the record to data identifying the unit of data requested by said processor.

22. The method of claim 17, further comprising the step of optimizing said memory system when said step of locating fails to locate sufficient available memory space to store said data transmitted by said processor.

23. An apparatus for storing data in and reading data from a memory system, composed of a plurality of semiconductor memory integrated circuits, in units of data commonly exchanged with a rotating memory device, the apparatus comprising:

an interface logic module coupled to said memory system;

a compression logic circuit coupled to said interface logic module;

an error correction logic circuit coupled to said compression logic circuit and said memory system;

a decompression logic circuit coupled to said error correction logic circuit and said interface logic module; and a processor coupled to said interface logic module, said compression logic circuit, said error correction logic circuit and said decompression logic circuit, wherein, to store one or more units of data, said processor:

causes said error correction logic circuit to read a cluster of units of data stored in said memory system;

causes said decompression logic circuit to decompress said cluster of units of data into a multiplicity of other units of data;

merges said one or more units of data with said multiplicity of other units of data to form a decompressed cluster of units of data;

causes said compression logic circuit to compress said decompressed cluster of units of data to produce a compressed cluster of units of data;

causes said error correction logic circuit to perform error correction coding of said compressed cluster of units of data to form a coded cluster of units of data; and causes said interface logic module to store said coded cluster of units of data in said memory system, a multiplicity of contiguous data bits of the coded cluster of units of data being stored in a single memory integrated circuit.

\* \* \* \* \*